(12) United States Patent
Klie

(10) Patent No.: US 8,718,993 B2
(45) Date of Patent: May 6, 2014

(54) MULTILEVEL PERCOLATION AGGREGATION SOLVER FOR PETROLEUM RESERVOIR SIMULATIONS

(75) Inventor: Hector M. Klie, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 209 days.

(21) Appl. No.: 13/005,606

(22) Filed: Jan. 13, 2011

(65) Prior Publication Data

US 2011/0191080 A1     Aug. 4, 2011

Related U.S. Application Data

(60) Provisional application No. 61/300,727, filed on Feb. 2, 2010.

(51) Int. Cl.
    *G06G 7/48*            (2006.01)
    *G06F 7/60*            (2006.01)

(52) U.S. Cl.
    USPC ...................................... 703/10; 703/6; 703/2

(58) Field of Classification Search
    USPC .................. 703/9–10; 702/45–56, 100, 6–13
    See application file for complete search history.

(56) References Cited

U.S. PATENT DOCUMENTS

| | | | |
|---|---|---|---|
| 6,318,156 B1 | 11/2001 | Dutton et al. | |
| 6,549,854 B1 | 4/2003 | Malinverno et al. | |
| 6,823,297 B2 | 11/2004 | Jenny et al. | |
| 6,842,725 B1 | 1/2005 | Sarda | |
| 6,901,391 B2 | 5/2005 | Storm, Jr. et al. | |
| 6,922,662 B2 | 7/2005 | Manceau et al. | |
| 6,980,940 B1 | 12/2005 | Gurpinar et al. | |
| 7,006,959 B1 | 2/2006 | Huh et al. | |
| 7,099,811 B2 | 8/2006 | Ding et al. | |
| 7,249,009 B2 | 7/2007 | Ferworn et al. | |
| 7,305,306 B2 | 12/2007 | Venkataramanan et al. | |
| 7,369,979 B1 | 5/2008 | Spivey | |
| 7,548,873 B2 | 6/2009 | Veeningen et al. | |
| 2003/0216898 A1 | 11/2003 | Basquet et al. | |
| 2004/0148147 A1 | 7/2004 | Martin | |
| 2007/0010979 A1 | 1/2007 | Wallis et al. | |
| 2007/0203681 A1 | 8/2007 | Eyvazzadeh et al. | |
| 2007/0265815 A1 | 11/2007 | Couet et al. | |

(Continued)

FOREIGN PATENT DOCUMENTS

| | | |
|---|---|---|
| WO | 0102832 | 1/2001 |
| WO | 2007061618 | 5/2007 |
| WO | 2008006851 | 1/2008 |
| WO | 2008008121 | 1/2008 |

OTHER PUBLICATIONS

Percolation Clustering, Dijana Zilic, Physics Department, Faculty of Science, University of Zagreb, Croatia, Jul. 2000.*

(Continued)

*Primary Examiner* — Matt Kim
*Assistant Examiner* — Maryam Ipakchi
(74) *Attorney, Agent, or Firm* — ConocoPhillips Company

(57) ABSTRACT

An efficient percolation aggregation solver methodology captures media connectivity and continuity to reliably incorporate relevant flow solution trends in subterranean formation models. The approach allows introduction of meaningful physical information that is generally overlooked by state-of-the-art algebraic algorithms in the solution process. Percolation aggregation extends the efficiency and robustness of solution methods used to solve scientific and engineering problems.

8 Claims, 6 Drawing Sheets

(56) References Cited

U.S. PATENT DOCUMENTS

| | | | |
|---|---|---|---|
| 2007/0288214 A1 | 12/2007 | DeMartini et al. | |
| 2008/0059140 A1 | 3/2008 | Salmon et al. | |
| 2008/0208539 A1 | 8/2008 | Lee et al. | |
| 2008/0262809 A1 | 10/2008 | Carruthers et al. | |
| 2009/0184958 A1* | 7/2009 | Osypov et al. | 345/420 |
| 2011/0166843 A1* | 7/2011 | Hsu et al. | 703/10 |

OTHER PUBLICATIONS

Adaptive Smoothed Aggregation (αSA) Multigrid, M. Brezina, R. Falgout, S. Maclaghlan, T. Manteuffel, S. McCormick, and J. Ruge, Center for Applied Scientific Computation, SIAM Jouirnal on Scientific Computing, vol. 25, No. 6, 2004, pp. 1896-1920.*

An Aggregation Multilevel Method Using Smooth Error Vectors; Edmond Chow, Lawrence Livermore National Laboratory Technical Report UCRL-JRNL-204139, 2006.*

Percolation Approach in Underground Reservoir Modeling, Mohsen Masihi and Peter R. King, Dept. of Chemical and Petroleum Engineering, Sharif University of Technology, Earth Science and Engineering Department, Imperial College of London, Mar. 2012.*

A Novel Percolative Aggregation Approach for Solving Highly Ill Conditioned Systems, H. Klie, M.F. Wheeler, 11th European Conference on the Mathematics of Oil Recovery, Bergen, Norway, Sep. 8-11, 2008.*

Chow, "An Aggregation Multilevel Method Using Smooth Error Vectors," SIAM J. Sci. Comput., 27 (2006), pp. 1727-1741. UCRL-JRNL-204139.

Efremov, et al. "Multilevel modeling of the influence of surface transport peculiarities on growth, shaping, and doping of Si nanowires," Physica E: Low-dimensional Systems and Nanostructures, 40:2446-53 (2008).

Naguib, et al. "Optimizing Field Performance Using Reservoir Modeling and Simulation" SPE 70037-MS, SPE Permian Basin Oil and Gas Recovery Conference, May 15-17, 2001, Midland, Texas.

Zhao, "Thesis: Mass Transfer to/from Distributed Sinks/Sources in Porous Media," Univ. Waterloo, Waterloo, Ontario, Canada, 2006 pp. 192.

Klie, et al. "A Novel Percolative Aggregation Approach for Solving Highly Ill-Conditioned Systems", 11th European Conference on the Mathematics of Oil Recovery—Bergen, Norway, Sep. 8-11, 2008.

* cited by examiner

MULTILEVEL PERCOLATION AGGREGATION SOLVER FOR PETROLEUM RESERVOIR SIMULATIONS

CROSS REFERENCE TO RELATED APPLICATIONS

This application is a non-provisional application which claims benefit under 35 USC §119(e) to U.S. Provisional Application Ser. No. 61/300,727 filed Feb. 2, 2010, entitled "MULTILEVEL PERCOLATION AGGREGATION SOLVER FOR PETROLEUM RESERVOIR SIMULATIONS," which is incorporated herein in its entirety.

STATEMENT OF FEDERALLY SPONSORED RESEARCH

None.

FIELD OF THE DISCLOSURE

An efficient percolation aggregation solver methodology captures media connectivity/continuity to reliably incorporate relevant flow solution trends in large scale petroleum reservoir simulations. The approach allows introduction of meaningful physical information that is generally overlooked by state-of-the-art algebraic algorithms into the solution process.

BACKGROUND OF THE DISCLOSURE

In recent years, there has been a resurgence in developing new solver technologies for addressing highly complex and large-scale flow simulations on specialized parallel and multicore architectures in a very effective manner. Methods such as algebraic multigrid (AMG), Krylov recycling (e.g., deflation, Krylov-secant) and extensions to two-stage preconditioners (e.g., GPR) have been incorporated into the latest solver advances.

Jenny, et al., U.S. Pat. No. 6,823,297, teaches a multi-scale finite-volume (MSFV) approach for solving elliptic or parabolic problems such as those found in subsurface flow simulators. Wallis and Tchelepi, US2007010979, use an algebraic cascading class to reduce cell nodes to two or more domains and graphing the model. Lee, et al., US2008208539, utilize a multi-scale finite-volume (MSFV) method to deal with non-linear immiscible three phase compressible flow in the presence of gravity and capillary forces. Poulisse, et al., WO2008006851, use algebraic methods to generate a polynomial ring that describes the polynomial relationship between the variables. Finally, Carruthers and Neufeld, US2008262809, model the migration of a reactant in a petroleum reservoir using a mesh comprising a plurality of nodes to calculate one or more variables in the model.

A recent survey of methods to perform a static characterization of reservoirs is given by Hovadik and Larue (2007). Percolation algorithms offer efficient ways to perform qualitative predictions on random media (Torquato, 2001; Bollobas and Riordan, 2006). In particular, the Hoshen-Kopelman algorithm (1976) is one of the most popular approaches to find critical paths, percolation thresholds, and conductive clusters. In many pore network studies, the random media is represented by a set of sites (nodes) and bonds (links) labeled according to the presence or absence of a particular property (e.g., conductance, reaction condition). The determination of the number, size and shape of clusters in a percolation graph is critical to perform reliable statistics on the conductive pattern in such random systems. Most of the clustering analysis is numerically estimated with the aid of the H-K algorithm on lattice environments (Hoshen and Kopelman, 1976). However, an efficient version of this clustering algorithm was recently proposed in (Al Futaisi and Patzek, 2003) that is suitable for arbitrary geometries.

Nodes can be visited in an either depth-first search or breadth-first search fashion (Jungnickel, 2008) giving rise to an algorithm of linear complexity in terms of the sum of the number of nodes and edges. Moreover, this algorithm can be implemented with slight modifications to the better known family of spanning trees algorithms (Babalievski, 1997). Aggregation or agglomeration can be used to gather strongly connected coefficients into a single set (aggregate). The reduction of these aggregates leads to the construction of coarse operators that are suitable to reduce the computational burden of the original problem (see e.g. Fish and Belsky 1997; Brezina et al., 2005; Muresan and Notay 2008). Aggregation is usually achieved by mapping the coefficients into a graph and then finding a maximal independent set consisting of no adjacent nodes—or equivalently, a collection of edges that do not share a common node.

High coefficient contrasts commonly arise, for example, in multilayered geological formations composed of different type of rocks (e.g., sandstones, shales, carbonates, limestones) (Torquato, 2001). Understanding the role of these systems characterized by highly heterogeneous media has been the subject of intensive research to account for all possible scales present in the problem (see e.g., Hou et al., 1999; Lackner and Menikoff, 2000; Tchelepi et al., 2005; MacLachlan and Moulton, 2006). Nevertheless, many of these approaches disregard the fact that the random media often contain connected regions defining preferential solution paths (e.g., fluid flow, pressures, electrical conductance, resistivity or transmissibility depending on the application) that may be helpful to improve the solution process. From the linear algebra standpoint, some authors have been particularly interested in establishing a "downwind" or "crosswind" criteria to adapt solver algorithms to follow directions with strong coupling (Wang and Xu, 1999; Kim et al., 2003). In the general case of pressure systems arising from IMPES formulations, a symmetric formulation may be preferred (see e.g., Naben and Vuik, 2006).

$$M = (I - AM_1)M_2(I - M_1A) + M_1$$

A preprocessing scaling step before applying the whole main preconditioner step has been proposed but has not been shown in use with a preconditioner system (Graham and Hagger, 1999; Aksoylu and Klie, 2008). A matrix compensation algorithm (Lu, 1995; Huang et al. 2007) can be optionally applied to discard weakly connected coefficients. The homogeneous system can be described by relaxation sweeps; (see e.g., Brezina et al., 2005; Huang et al. 2007). Spectral preconditioners (Giraud and Gratton, 2006), can be seen as a powerful complement to improve the performance of existing preconditioners; (see e.g. Frank and Vuik, 2001; Naben and Vuik, 2006; Aksoylu and Klie, 2008)

Multilevel algebraic procedures cannot address assumptions present in developing reservoirs. These traditional algebraic methods do not accurately reflect positive definiteness, diagonal dominance, and the symmetry of linear systems operators found in subterranean formations and production data. Although current algebraic systems can be used to efficiently describe moderately sized and relatively well posed problems, the cannot be applied to highly heterogeneous and anisotropic media for large scale petroleum reservoir simulations.

BRIEF DESCRIPTION OF THE DISCLOSURE

Using linear coefficients strongly correlated coefficients are aggregated at different resolution levels. The progressive computation and reduction of theses aggregates produces nested approximate solutions that can be further refined by propagating residuals back to the original resolution level.

In one embodiment, a reservoir simulation solver method uses mapping of a linear system matrix into a connectivity graph, determines one or more aggregates as a nested sequence of percolation clusters, transforms coarse operators associated with a reduction of aggregates at each level, smoothes corresponding residuals with an initial value and reduce to the next coarse level, determine if the reduced problem is coarse enough to proceed, otherwise smooth new residuals and repeat the initial steps, solve equation exactly, prolongate solution and correct solution at the next fine level, if the original fine level is reached proceed; otherwise, repeat solution and prolongation again, generate the subterranean formation model including transformed connectivity, percolation and flow information.

In another embodiment, aggregates are nested by recursively applying the Hoshen-Kopelman algorithm on a predefined list of threshold values.

BRIEF DESCRIPTION OF THE DRAWINGS

The invention may best be understood by reference to the following description taken in conjunction with the accompanying figures.

DETAILED DESCRIPTION OF EMBODIMENTS OF THE INVENTION

Figure 1:
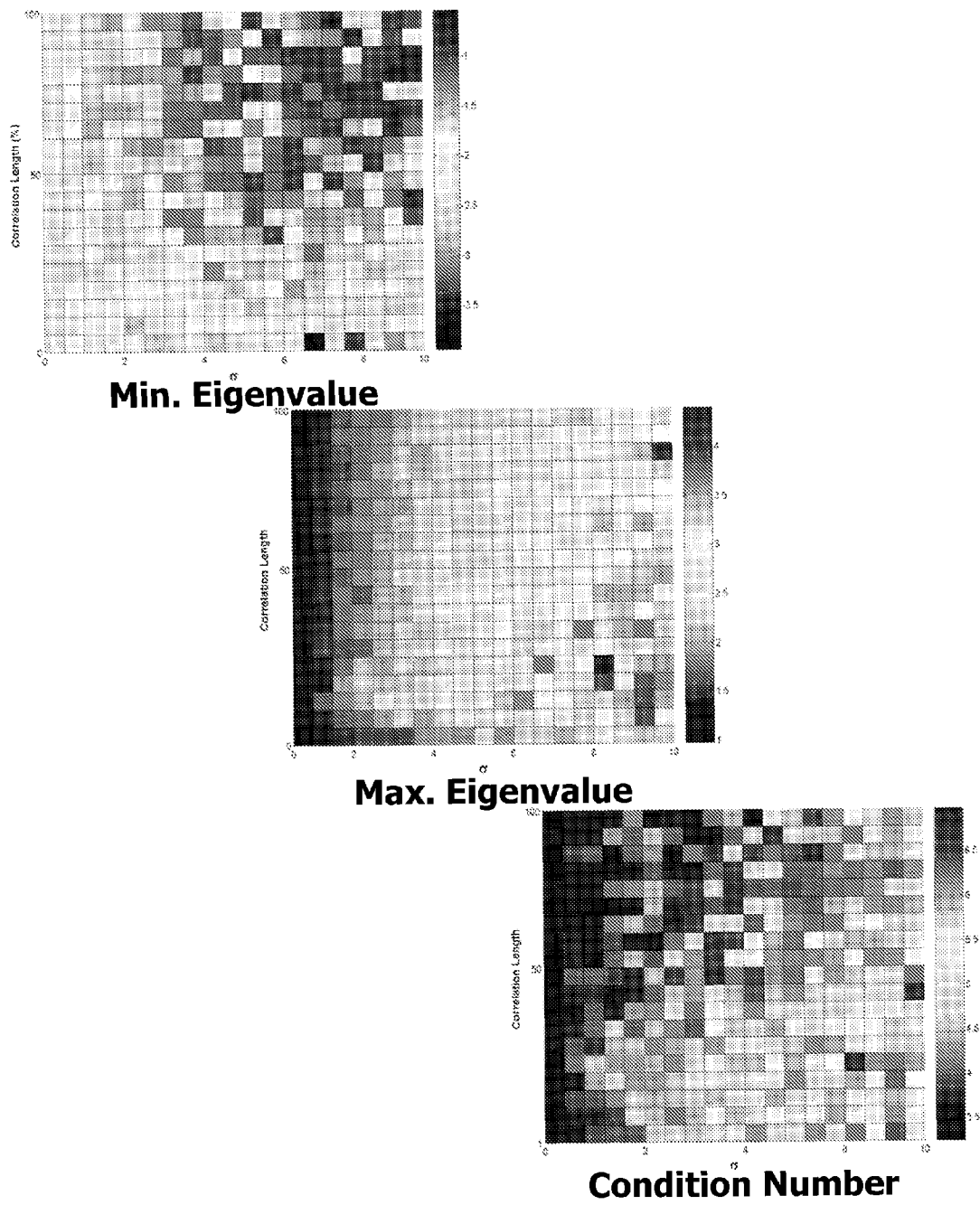
FIG. 1: (Left to right) Variation of minimum eigenvalue, maximum eigenvalue and condition number of a pressure system for different variability and correlation lengths as given by Eq. (1).

Trends can be obtained in other stationary and non-stationary distributions such as those arising in layered or channelized formations where the greater the coefficient jump (spatial variability) the higher the associated linear system condition number (Aksoylu and Klie, 2008). The separation of unknowns into high- and low-conductive blocks was recently proposed by (Aksoylu and Klie, 2008) and further analyzed by (Aksoylu et al., 2008) without the aid of percolation ideas. In both of these works, the reordering was performed assuming that there were only two distinctive clusters even though high conductive regions could have been further separated into distinctive aggregates as explained above. Note that the size and shape of these aggregate elements may vary significantly due to the arbitrary topology of media conductivity. In the case of bond percolation, others factors may enter into play such as reservoir geometry, mobility ratios and well rates.

In order to generate the percolation clusters via the H-K algorithm, we need to specify a threshold value to be able to separates conductive coefficients from the not conductive ones. Depending on the properties we are looking at, this threshold value could represent the average permeability field or the average transmissibility value contained in the matrix coefficients. Notice that we are being loose with this argument for the sake of maintaining the simplicity of the description. Finding the exact percolation threshold and performing operations such as removing dead paths from the critical path backbone ("burning") need improvement. Furthermore, in realistic reservoir scenarios, including all well terms within the percolation spanning cluster is required.

The present work features a two-stage percolation aggregation (2SPA) preconditioning strategy for solving multiphase and compositional problems in highly heterogeneous media. The preconditioner is a physics-based or physics-driven solver since the underlying physical connectivity described by either background media (e.g., permeability, porosity) or flow patterns (governed by transmissibility coefficients) is captured in the solution process of the associated system of algebraic equations.

The 2SPA preconditioner involves the combination of two fundamental steps: (1) solution of blocks sharing the same connectivity strength (aggregates) and, (2) application of a deflation (spectral) preconditioner. The formation of blocks is possible thanks to the Hoshen-Kopelman (H-K) percolation algorithm (Hoshen and Kopelman, 1976) that finds all percolative clusters from a given connectivity graph properly labeled with open-close bonds (edges) and sites (nodes). We particularly use the H-K implementation proposed by (Al Futaisi and Patzek, 2003) that is suitable for arbitrary continuous systems and disordered networks. That is, their implementation can be used for any degree of connections at the sites, hence providing the potential to apply the 2SPA preconditioner for flow problems discretized on either structured or unstructured meshes.

In one embodiment, a multilevel percolation agglomeration algorithm involves the following steps:
   a. Mapping of the linear system matrix into a connectivity graph.
   b. Determination of a nested sequence of percolation clusters (aggregates) by recursively applying the Hoshen-Kopelman algorithm on a predefined list of threshold values.
   c. Computation of the coarsening (or prolongation) operators associated with the reduction (or extension) of aggregates at each level.
   d. Given an initial guess, smooth corresponding residuals and reduce the system to the next coarse level.
   e. If reduced problem is coarse enough, solve exactly. Otherwise smooth new residuals and go to Step d.
   f. Prolongate solution and correct solution at the next fine level.
   g. If original fine level is reached, stop; otherwise, go to step f.

In a multiscale and broader geometrical sense, formations with high coefficient contrasts, i.e. multilayered geological formations including are also composed of different minerals and are subject to various types of deformations. In terms of porous media flow simulation, these rock variations are characterized as porosity and permeability values. Although both properties affect different components of flow and transport equations, we particularly focus the attention on the effects that the permeability field has in the resulting algebraic system. This is motivated by the fact that the permeability is generally the main driving factor for the conductance or allowance of fluid to flow through the porous media. In fact, Darcy's Law states that the magnitude of permeability is proportional to the magnitude of fluid velocities for a given a gradient of fluid pressures. Additionally there is, in general, a direct proportionality between permeability and porosity: low permeability zones translates into low porosity zones causing the fluid to move slowly or even being absent in those regions, and conversely, high-permeability zones coincides with high-porosity zones, favoring fast fluid flow and the occurrence of regions invaded by the fluid.

The following examples of certain embodiments of the invention are given. Each example is provided by way of explanation of the invention, one of many embodiments of the invention, and the following examples should not be read to limit, or define, the scope of the invention.

Example 1

Exploiting Reservoir Connectivity and Heterogeneity

In one example a multilevel aggregation approach based on percolation, critical paths, percolation thresholds and conductive clusters are grouped on connectivity graphs with arbitrary distribution of open sites (nodes) and bonds (links). In the setting of linear systems arising in reservoir simulation, this algorithm can be effectively used to separate conductive coefficients from not conductive ones according a predefined threshold value. Since both coefficient and solutions obey to different resolution scales, this idea can be recursively applied to reorder coefficients into agglomerates (clusters) of similar connectivity strength. Each aggregate can be in turn associated with an average value (threshold) to progressively reduce the cost of computation. This can be repeated until the resulting problem size is amenable to an efficient direct solution. Errors incurred along the way can be later corrected by recovering those frequencies of the solution lost during the averaging process. These frequencies are recovered with the aid of a few sweeps using an inexpensive iterative solution (i.e., smoothing).

FIG. 1 shows the effect that media heterogeneity has in the conditioning of a pressure system for a single phase problem. To that purpose, we have fixed the problem size and vary the correlation length and variability associated with the log permeability field obeying the following exponential correlation function:

$$C_W(x_1, x_2) = \tag{1}$$
$$C_W(x_{1,1}, x_{1,2}; x_{2,1}, x_{2,2}) = \sigma_W^2 \exp\left[\frac{-1}{\eta}\{|x_{1,1} - x_{2,1}| + |x_{1,2} - x_{2,2}|\}\right],$$

where $\sigma_W^2$, is the spatial variability of the log field and $\eta$, is the correlation length. Several realizations were generated for different combinations of $\sigma_W^2$ and $\eta$. Note that for a constant problem size and meshsize, the smaller the correlation length and the greater the spatial variability, the larger the matrix condition number. The ill-posedness comes from the fact that the separation between the smallest and largest eigenvalues increases with variability in the media. Naturally, decreasing also the mesh size further aggravates the ill-conditioning of the system.

In order to generate the percolation clusters via the H-K algorithm, we specify a threshold value to separate conductive coefficients from the non-conductive coefficients. Depending on the properties we are looking at, this threshold value could represent the average permeability field or the average transmissibility value contained in the matrix coefficients. Notice that we are being loose with this argument for the sake of maintaining the simplicity of the description. Finding the exact percolation threshold and performing operations such as removing dead paths from the critical path backbone ("burning") allow improved resolution while reducing CPU time. Furthermore, in realistic reservoir scenarios, all well terms are included within the percolation spanning cluster.

Figure 2:
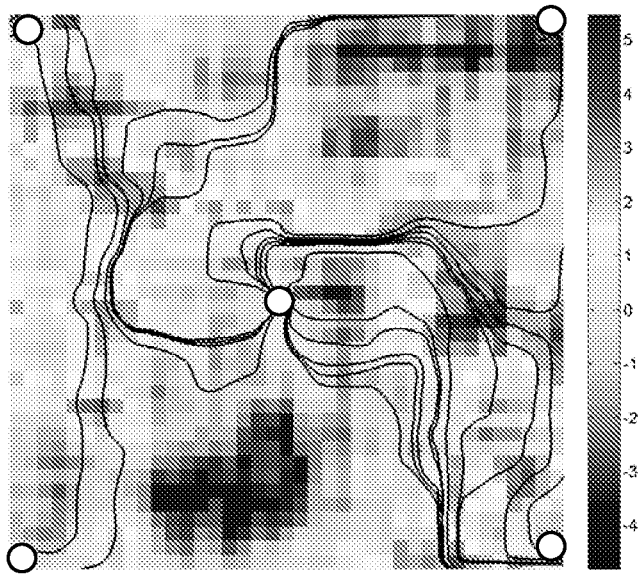
FIG. 2: Clustering of a random permeability: (Left) Log of the permeability field showing the streamlines from a single-phase solution consisting of 4 producers at each corner and one injector at the center; (Mid) Clustering of the permeability field obtained with a spectral partitioning method (Cour et al., 2005); (Right) Clustering of the permeability field using the H-K algorithm with threshold given my the mean geometric average.
Figure 2:
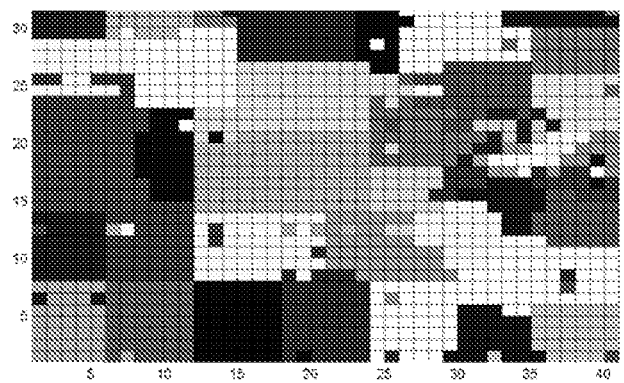
Figure 2:
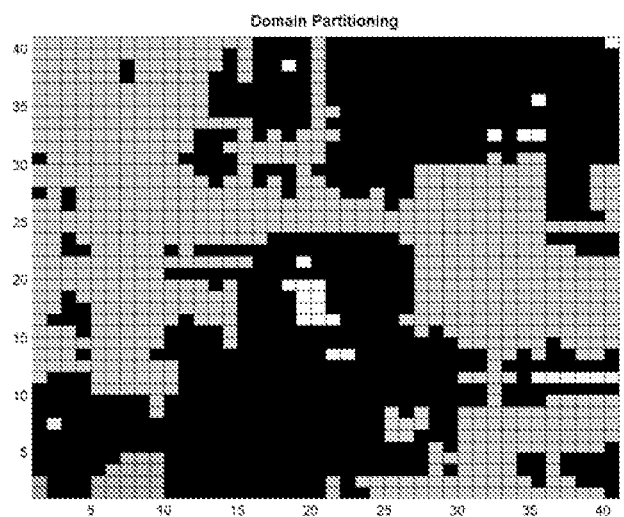

FIG. 2 compares the clusters generated by the H-K algorithm against a spectral partitioning algorithm. The spectral partitioning is just one way to compute clusters from a given connectivity graph in order to generate aggregate elements of similar size and shape. It can be observed that the streamline solutions are mainly contained in the main spanning cluster computed by the H-K algorithm, whereas the spectral partitioning disregards the overall connectivity of the media and may lead to unphysical averaging (i.e., coarsening) of intermediate solutions in each aggregate. The black zone generated by the H-K algorithm is assumed to contribute little to the solution relative to the main spanning cluster. Other spanning clusters can be seen as 'isolated reservoirs' with almost zero flow boundary conditions that can be treated separately in a single high conductive block.

The proposed procedure reduces CPU time for reservoir simulation through a multilevel approach that exploits the mutual strength of matrix coefficients and nested identification of percolation clusters. Using the H-K algorithm, we not only find strongly connected sets but also the sets obey particular geological or physical facts.

Example 2

The Two-Stage Percolation Aggregation (2SPA) Approach

In one example a multilevel aggregation approach based on percolation, critical paths, percolation thresholds and conductive clusters are grouped on connectivity graphs with arbitrary distribution of open sites (nodes) and bonds (links). In the setting of linear systems arising in reservoir simulation, this algorithm can be effectively used to separate conductive coefficients from not conductive ones according a predefined threshold value. Since both coefficient and solutions obey to different resolution scales, this idea can be recursively applied to reorder coefficients into agglomerates (clusters) of similar connectivity strength. Each aggregate can be in turn associated with an average value (threshold) to progressively reduce the cost of computation. This can be repeated until the resulting problem size is amenable to an efficient direct solution. Errors incurred along the way can be later corrected by recovering those frequencies of the solution lost during the averaging process. These frequencies are recovered with the aid of a few sweeps using an inexpensive iterative solution (i.e., smoothing).

As discussed above, the percolation algorithm delivers a set of different conductive clusters embedded on a non-conductive background depicted by a set of broken bonds or barrier sites. For each particular percolative cluster, we can renumber the coefficients in a sequential order. These clusters represent a physical aggregation of highly connected coefficients. All these aggregated blocks are arranged first followed by the coefficients belonging to the non-conductive bonds or sites of the percolation graph. Thus, if is the total number of percolative clusters then there is a total of aggregated blocks. Assuming that the pressure system is denoted by the general form, with and, the partitioning process induced by the H-K algorithm give rise to the following block formulation:

$$\begin{bmatrix} A_h & A_{hl} \\ A_{lh} & A_l \end{bmatrix} \begin{bmatrix} u_h \\ u_l \end{bmatrix} = \begin{bmatrix} f_h \\ f_l \end{bmatrix}. \quad (2)$$

The separation of unknowns into high- and low-conductive blocks was recently proposed by (Aksoylu and Klie, 2008) and further analyzed by (Aksoylu et al., 2008) without the aid of percolation ideas. In both of these works, the reordering was performed assuming that there were only two distinctive clusters even though high conductive regions could have been further separated into distinctive aggregates as explained above. Note that the size and shape of these aggregate elements may vary significantly due to the arbitrary topology of media conductivity. In the case of bond percolation, others factors may enter into play such as reservoir geometry, mobility ratios and well rates.

The percolation procedure can be performed assuming that there are open/close sites (nodes) and open/close bonds (links). In this regard, the connectivity graph used in percolation process can be associated with different properties in the nodes and links, which according to a given threshold, may be considered either open or close. This means that clustering of unknowns can obey to either a set of given mesh properties (e.g., permeability, porosity) or matrix coefficients (e.g., transmissibility, mobility). The first one can be implemented as a site percolation problem, with bonds given by the vicinity of mesh elements. The latter can be implemented as a bond percolation problem, with sites given by the unknown number.

Figure 3:
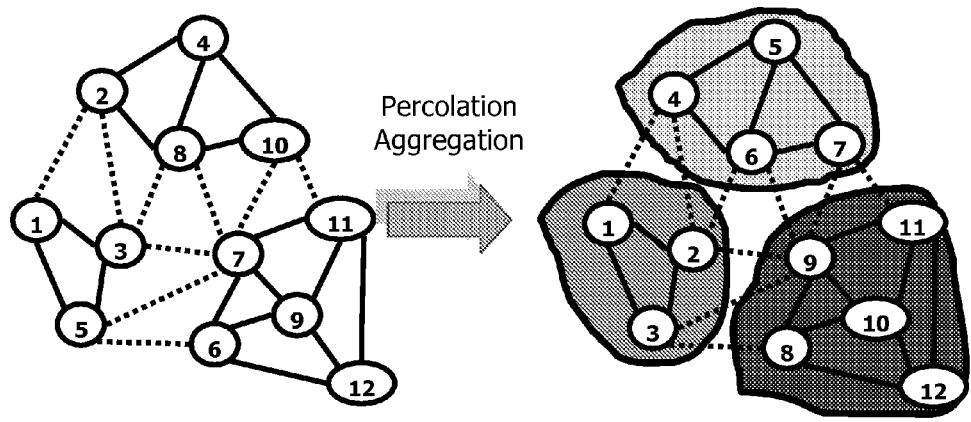
FIG. 3: Example of aggregation using bond percolation on a connectivity graph.

One may think that the site percolation problem may be suitable to (almost) steady state problems, whereas the bond percolation problem may be suitable for time-dependent problems where the linear system may undergo significant changes during the simulation. This observation offers the possibility to extend the method to a wide range of scenarios leading also to different implications in computational efficiency and robustness. FIG. 3 pictures how the aggregation (clustering of unknowns) can be achieved by a bond percolation strategy. Solid lines between elements indicate strong (open) bonds, whereas dotted lines indicate weak (close) connections. The H-K algorithm will therefore detect 3 strongly connected percolative clusters.

Given the form of Eq. (2), we are now in position to construct the two-stage preconditioner as the effective combination of two preconditioners into a single one. This can be realized in an additive or multiplicative way, being the later the most effective one. Therefore, the general form of the multiplicative two-stage preconditioner is the following:

$$M = M_1 + M_2(I - AM_1), \quad (3)$$

Diagonal Scaling. In most pressure systems arising in reservoir applications, diagonal dominance if generally guaranteed due to the positive contribution of compressibility and well terms in the main diagonal matrix. Nevertheless, exceptions to this rule may occur with the contribution of producing wells under compressibility regimes. In any case, scaling the matrix has the effect of acting as a default preconditioner, since the resulting scaled matrix has all eigenvalues clustered within the interval. Scaling also aims at breaking the relative degree of coupling (or separation) between $A_h$ and $A_l$ and among the entries belonging to each of these blocks. Given the block matrix decomposition in (2), a suitable row scaling can be performed by defining the scaling matrix $$D^{-1} = \begin{bmatrix} \text{Diag}(A_h)^{-1} & 0 \\ 0 & \text{Diag}(A_l)^{-1} \end{bmatrix}. \quad (4)$$

In the case of symmetric systems, the application of is advisable from both sides of, that is, the system Ax=f is transformed to $D^{-1/2}AD^{-1/2}(D^{1/2}x = D^{-1/2}f \Rightarrow \hat{A}\hat{x} = \hat{f}$ with $x = D^{-1/2}\hat{x}$.

Solving the High-Conductivity Block. Approximating the inverse of the matrix in Equation (2) in terms of the solution of $A_h$, requires the formulation of a restriction and prolongation operator in the same fashion that is done in multigrid or multilevel algorithms. In our case, such operation is relative simple and does not involve explicit storage of these operators. Let $R = [I_{Nh \times Nh} | 0_{(N-Nh) \times Nh}]^t$ the restriction operator and its transpose the prolongation operator. Let an arbitrary residual vector to be preconditioned with, then the constrained solution of the high conductive block can be depicted as follows:

$$M_1 v = R(R^t A R)^{-1} R^t v = \begin{bmatrix} A_h^{-1} & 0 \\ 0 & 0 \end{bmatrix} \begin{bmatrix} v_1 \\ v_2 \end{bmatrix} = \begin{bmatrix} A_h^{-1} v_1 \\ 0 \end{bmatrix}. \quad (5)$$

Note that if $M_2 \equiv I_{N \times N}$, the action of the preconditioner (depicted in equation (3)) onto A becomes:

$$MA = \begin{bmatrix} I_h & A_h^{-1} A_{hl} \\ 0 & A_S \end{bmatrix}. \quad (6)$$

Here, $A_s = A_l - A_{lh} A_h^{-1} A_{hl}$, is the Schur complement of A with respect to $A_h$. From (6) it immediately follows that the condition number of the resulting preconditioning system is governed by the condition number of $A_s$. More precisely, $\sigma\{MA\} = \sigma\{A_s\} \cup \{1\}$, where $\sigma\{*\}$ is the spectral radius operator.

The previous analysis indicates that the action of $M_2$ should somehow remove the negative effects that the conditioning of $A_s$ may have in the resulting preconditioned residuals. In fact, (Aksoylu and Klie, 2008) were able to show that for a fixed discretization mesh size and for a varying size of the jump between low and high conductivity coefficients, the Schur complement $A_s$ converges to a low-rank perturbation of the low conductivity block $A_l$. This has important computational implications since explicit formation of the Schur complement may not be necessary in problems with extreme permeability contrasts. Once again, we still need to watch for the ill-posedness in problems that do not show a clear separation between high- and low-conductivity values and to the nature of the problem size. This is were the action of preconditioner $M_2$ should complement that of $M_1$.

Depending on the problem size, the operation depicted in (5) can be carried out by a direct method or a AMG type procedure. In many cases, the size of $A_h$ could be significantly smaller than the original matrix A, thus implying some important computational savings. Moreover, if the percolation aggregation was performed using a site constraint criterion (i.e., using only static information such as permeability), then there is not coupling among all agglomerate elements in $A_{j_h}$, thus making this procedure amenable for parallel implementations. Obviously, due to the irregular size of each aggregate some special algorithm considerations may still apply to achieve the best load balancing in this case. In case of using a bond percolation approach, an AMG algorithm may be able to disregard the weak coupling among agglomerates and then become more efficient in this case than for the original problem.

Matrix Compensation. Before proceeding to the formulation of the deflation preconditioner $M_2$, it is important to stress alternatives to alleviate the computation of extreme eigenvalues. A matrix compensation algorithm can be optionally applied to discard weakly connected coefficients lying in both and $A_{hl}$ and $A_{lh}$. Moreover, additional weakly connected elements can be effectively removed from the off-diagonal elements of $A_h$, and $A_l$ depending on the mutual strength between the high-conductive aggregate blocks. The matrix compensation encompasses the elimination of small entries and redistribution of the larger ones into the corresponding block aggregates in $A_h$ and $A_l$. This operation yields a strictly block diagonal system for $A_h$ and $A_l$ and zeroes out completely the off-diagonal blocks $A_{hl}$ and $A_{lh}$. The selection of entries to be discarded or added to the each aggregate block obeys a global error estimation criteria based on a few relaxation sweeps to the homogeneous system Ae=0. The resulting block diagonal system is not only more amenable to be solved in parallel but also suitable for achieving smaller global errors associated with the approximation to A via only $A_h$.

Deflation Preconditioner. Deflation preconditioners rely on capturing approximate invariant subspace corresponding to extreme eigenvalues and removing those components of the solution associated with these eigenvalues. As we show in FIG. 1, severe heterogeneities are a source of relatively small eigenvalues that become challenging to be removed by most conventional solver approaches including deflation preconditioners.

The previous system arrangement into aggregates followed by a matrix compensation step offers important improvements to achieve and efficient implementation of deflation operators. The key point is that the eigenvalue computation can be carried out in parallel on relative small blocks by means of Lanczos or Arnoldi iterations. Lanczos iterations are amenable for symmetric positive definite systems whereas Arnoldi iterations are for dealing with general non-symmetric indefinite systems. This alternative is the basis for defining Krylov-based deflation operators. Moreover, an even more attractive approach is to perform the estimation of smallest eigenvalues in terms of local unitary vectors per aggregate element (or subdomain). This is known as the domain-based deflation. Assuming that a given aggregate $A_i$, i=1, 2, ... Nc+1, can be decomposed as $$A_i V_s = V_s H_s + \beta v_{s+1} e_s^t,  \quad (7)$$

by a means of s steps of the Lanczos (Arnoldi) factorization with $H_s \in \Re^{s \times s}$ a triangular (an upper Hessenberg), $V_s \in \Re^{Nh_i \times s}$ an orthonormal rectangular matrix, $\beta \in \Re$ a scalar, $v_{s+1} \in \Re^{Nh_i}$, and $e_s^t = (0, \ldots, 0, 1)^t \in \Re^s$, the approximated eigenvalues of $A_i$ can be computed from the harmonic Ritz eigenvalue problem $$(H_s + \beta^2 H_s^{-t} e_s e_s^t) u = \mu u. \quad (8)$$

The harmonic Ritz values $\mu_i$, i=1, 2, ..., s, approximate very accurately the extreme eigenvalues of $A_i$. To compute the corresponding eigenvector $z_i$ of $\mu_i$, we just compute $z_i = V_s u_i$. Since, we are only interested in a few number of eigenvalues, s may be very small compare to the aggregate size $Nh_i$, that, in turn, is smaller than the number of unknowns $N_h$. In contrast, the domain-based approach lead to a straightforward way to estimate the eigenvalue $z_i$, namely, $$(z_i)_j = \begin{cases} 1 & x_j \in G_i \\ 0 & \text{otherwise} \end{cases} \quad (9)$$

Here, $G_i$ represents the set unknowns associated with the aggregate $A_i$. From the implementation standpoint, both Krylov-based and domain-based deflation approaches should be combined to achieve the maximum balance between efficiency and robustness. The former is more accurate and reasonably fast on moderate and sparse block sizes than the latter. The later is faster than the former in the event of having relatively dense or large aggregates.

Assuming that for the deflation preconditioner we choose as many smallest eigenvalues as the number of aggregates, we can construct the orthogonal matrix $Z = |z_1 | z_2 | \ldots |z_{Nc+1}| \in \Re^{N \times (Nc+1)}$ and form the following deflation preconditioner for $M_2$ $$M_2 = Z(Z^t A Z)^{-1} Z^t + I - ZZ^t. \quad (10)$$

This formulation was proposed by (Baglama et al., 1998) to shift the smallest eigenvalues of A to 1. In fact, there are variants of these preconditioner based on the spectral information held by Z that may be also applicable to the present framework; (see e.g. Giraud and Gratton, 2006).

Numerical Experiments. In the following, we consider a couple of relatively small problems but with high permeability contrast in order to evaluate the potential of the 2SPA preconditioner in reservoir simulations. We use the ILU(0) preconditioner, still a robust option in current reservoir simulators, as a reference to measure the performance of 2SPA. The cases are:

Case A: A 40×40 highly heterogeneous case with an injection well in the upper left corner and producer in the opposite lower right corner.

Case B: An upscaled 30×100 slice from the SPE10 Comparative Project datacase (Christie and Blunt, 2001) using the same well configuration than the previous case.

Cases were run using a two-phase flow simulation using an IMPES option. The analysis focus in the pressure system obtained after 1000 timesteps of simulation. Input data is based in the SPE10 Comparative Project specification. For running these cases, a site percolation strategy was used based on the permeability field values at the gridcell. Also, we used the geometric mean value of the permeability field as the percolation threshold to partition and generate the corresponding aggregates. Given the relative small size of the aggregate elements in $A_h$, we use a direct method for solving their associated system. For the implementation of the deflation preconditioner $M_2$, we used as many deflation vectors as agglomerate elements and using mixed criteria of domain-based and Krylov-based deflation vectors, as follows: If the size of the aggregated was larger than 30, we use a domain-based criteria (eq. (9)), otherwise a Krylov-based (eq. (8)). A conjugate gradient method was used as linear accelerator.

Figure 4:
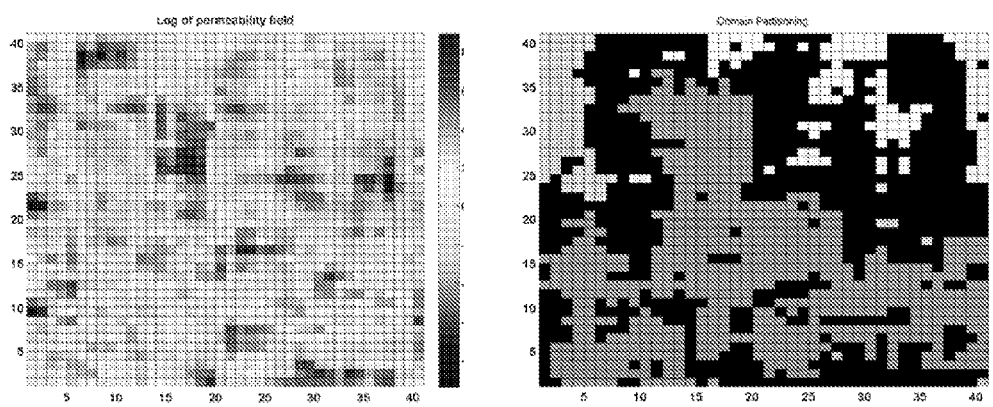
FIG. 4. Permeability and percolation clustering for Case A.
Figure 5:
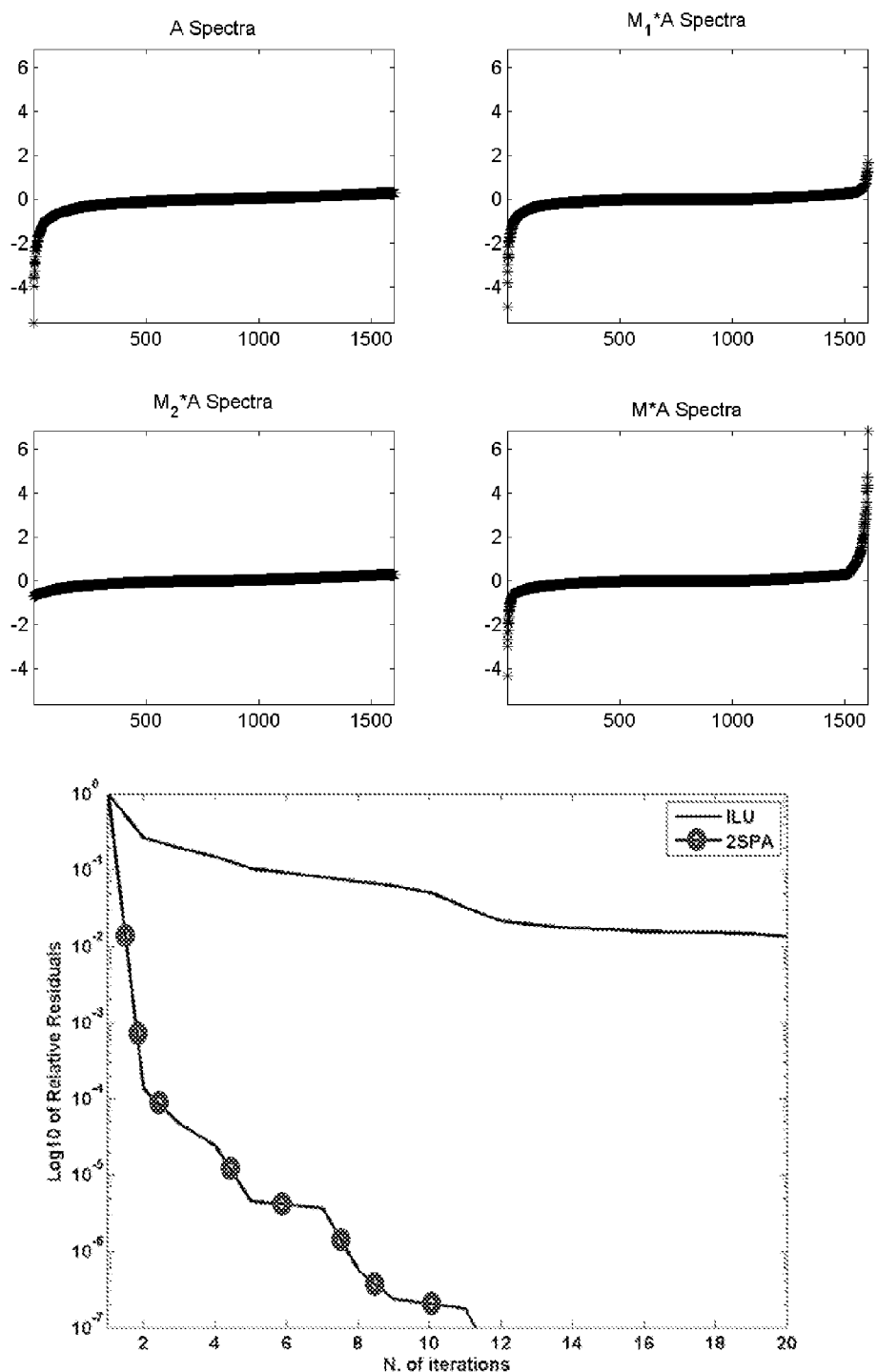
FIG. 5. Spectral information (left) and convergence history for Case A (right).
Figure 6:
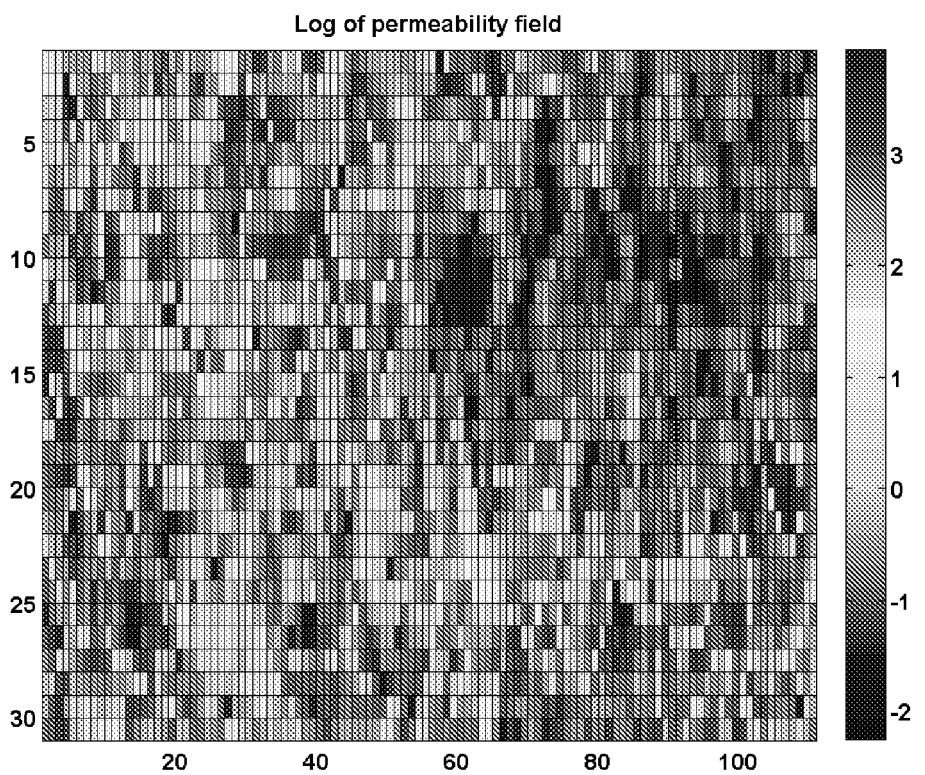
FIG. 6. Permeability and percolation clustering for Case B.
Figure 6:
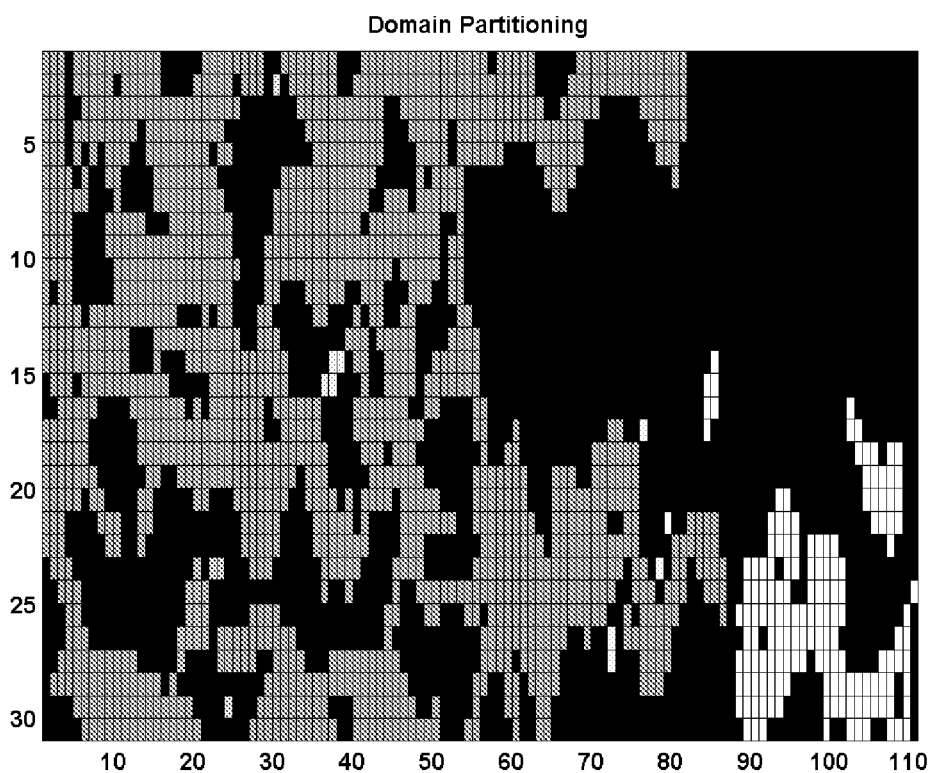

FIGS. 4 and 5 correspond to Case A. In FIG. 4, we can observe the percolation clustering generated by the H-K algorithm. Clearly, this algorithm gathers into the same cluster, gridcells sharing the same conductivity strength. Left of FIG. 5 and from left to right and top to bottom, shows the spectral information associated with matrix scaled matrix A, the preconditioner M times A for $M_2$=I, $M_2$A and, MA using the preconditioner with the full specification for $M_1$ and $M_2$ as given by equations (5) and (10), respectively. The spectral plot illustrates the role that each component of the preconditioner M in improving the condition number of the original matrix. Note that the scaled matrix has its eigenvalues within the interval [0, 2] due to the diagonal dominance associated with the pressure system. Nevertheless, there are a number of very small eigenvalues, being the smallest of the order of $10^{-6}$. Upon using the $M_1$ preconditioner, a great number of them cluster around 1 (equal 0 in the logarithmic scale). On the other hand, the deflation operator itself does a good job eliminating the small eigenvalues. The overall action of the preconditioner M is capable of shifting some small eigenvalues to 1, and some of them are shifted outside the interval [0, 2] with mild effects in the overall system condition number. As a result of the previous observation, the 2SPA outperforms clearly the ILU preconditioner (see right side of FIG. 5). In fact, the ILU tends to stagnate as result of the coefficient contrast implied by the highly heterogeneous permeability field.

Figure 7:
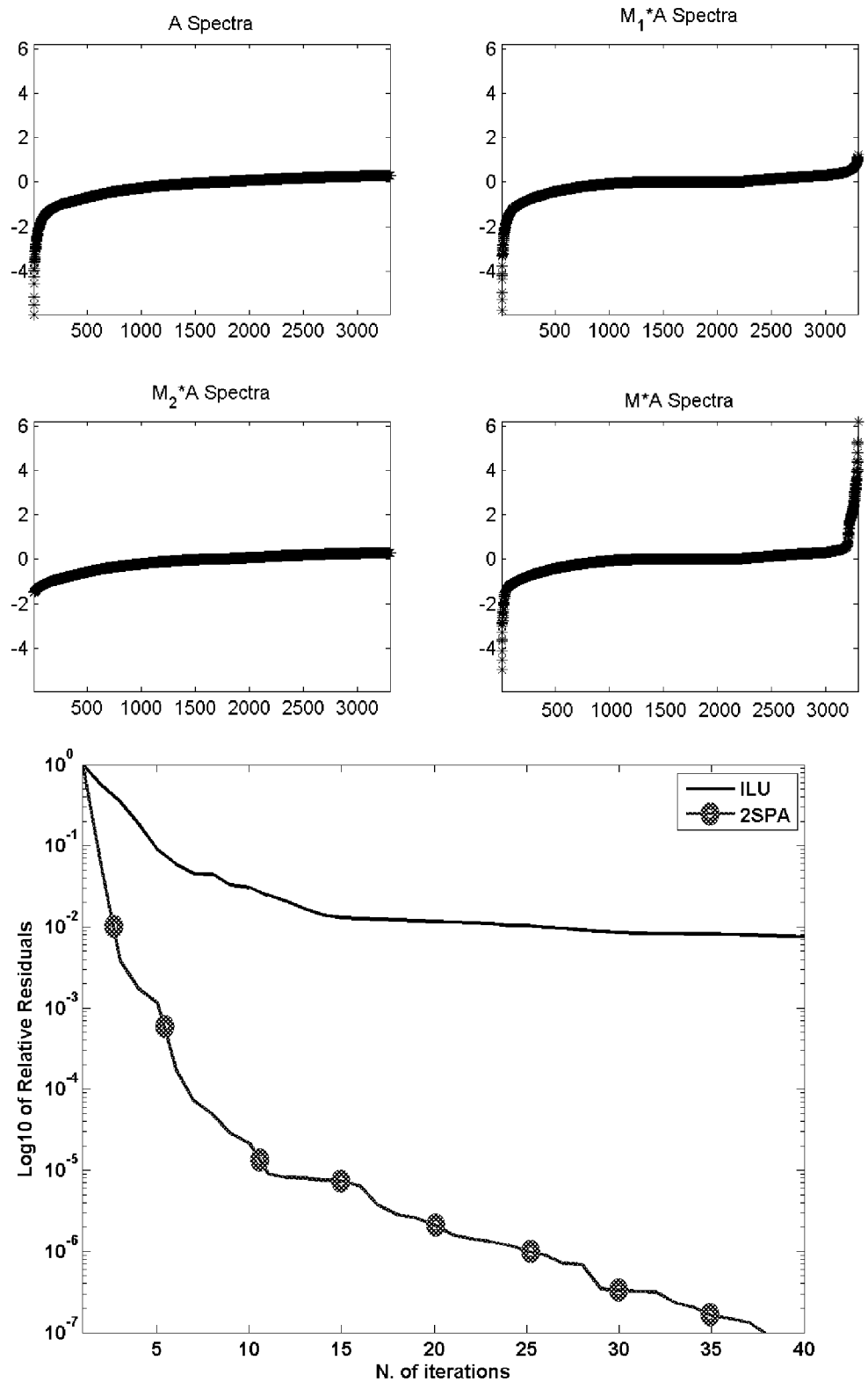
FIG. 7. Spectral information and convergence history for Case B.

Case B shows analogous results. In this case, the permeability field is characterized by high permeable channels embedded into a low permeable region. Again, the H-K algorithm identifies a big portion (around 40%) of highly conductive coefficients that are worth to include in the solution process associated with the preconditioner $M_1$. The deflation preconditioner $M_2$ does again a complementary job in shrinking the spectrum of the resulting preconditioned matrix (left of FIG. 7). Consequently, the 2SPA preconditioner is able to converge in approximate 10 iterations to reach to a residual of the order $10^{-5}$. The ILU preconditioner converges very slowly due to the roughness of the permeability field; these slow convergence has been also observed in (Frank and Vuik, 2001; Aksoylu and Klie, 2008).

The present work introduced the 2SPA preconditioner as a novel physics-based approach to tackle ill-conditioned pressure systems that may arise in multiphase and compositional flow problems. The preconditioner can take into account static information such as the connectivity of a permeability field or even richer information in terms of the physical connectivity implied by transmissibility coefficients. The approach differs from conventional agglomeration and algebraic multigrid approaches in that it incorporates connectivity path or flow trends into the agglomeration process via percolation rather than relying on local connectivity information.

Although the systems and processes described herein have been described in detail, it should be understood that various changes, substitutions, and alterations can be made without departing from the spirit and scope of the invention as defined by the following claims. Each and every claim is incorporated into the specification as an embodiment of the present invention. Thus, the claims are part of the description and should be deemed to be additional description to the preferred embodiments of the present invention.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 6,842,725, "Method for modelling fluid flows in a fractured multilayer porous medium and correlative interactions in a production well" Inst Francais Du Petrole, Sarda (1998).
2. U.S. Pat. No. 6,549,854, U.S. Pat. No. 6,826,486, WO0048022, "Uncertainty constrained subsurface modeling" Schlumberger, Malinverno, (1999).
3. WO0102832, "Modelling the Rheological Behaviour of Drilling Fluids as A Function of Pressure and Temperature" Sofitech/Schlumberger, Allouche (1999).
4. U.S. Pat. No. 6,318,156, U.S. Pat. No. 6,564,619, U.S. Pat. No. 6,810,719, "Multiphase flow measurement system" Micro Motion, Dutton, (1999).
5. U.S. Pat. No. 7,006,959, U.S. Pat. No. 7,324,929, US2006020438, WO0127755, "Method and system for simulating a hydrocarbon-bearing formation" ExxonMobile Upstream Res., Huh, (1999).
6. U.S. Pat. No. 6,980,940, US2005149307, US2007156377, US2008288226, WO0162603, "Integrated reservoir optimization" Schlumberger Technology Corp., Gurpinar, (2000).
7. U.S. Pat. No. 6,922,662, US2002016702, "Method for modelling flows in a fractured medium crossed by large fractures" Inst Francais du Petrole, Cosentino, (2000).
8. U.S. Pat. No. 6,901,391, US2002138241, WO02077728, "Field/reservoir optimization utilizing neural networks" Halliburton Energy Services, Storm, (2001).
9. U.S. Pat. No. 7,099,811, US2002188431, "Method of determining by numerical simulation the restoration conditions, by the fluids of a reservoir, of a complex well damaged by drilling operations" Inst Francais du Petrole, Ding, (2001).
10. U.S. Pat. No. 7,249,009, US2003182061, WO03081233, "Method and apparatus for simulating PVT parameters" Baker Geomark, Ferworn, (2002).
11. US2003216898, "Method for modelling fluid flows in a multilayer porous medium crossed by an unevenly distributed fracture network" Inst Francais Du Petrole, Basquet, (2002).
12. US2004148147, "Modeling in-situ reservoirs with derivative constraints" Pavilion Tech Inc, Martin, (2003).
13. U.S. Pat. No. 7,548,873, US2005209912, "Method system and program storage device for automatically calculating and displaying time and cost data in a well planning system using a Monte Carlo simulation software" Schlumberger, Veeningan, (2004).
14. U.S. Pat. No. 6,823,297, US2004176937, US2005177354, WO2004081845, WO2006058171, "Multi-scale finite-volume method for use in subsurface flow simulation" Schlumberger, Jenny, (2004).
15. U.S. Pat. No. 7,305,306, U.S. Pat. No. 7,398,159, US2006155472, US2006155474, " " Schlumberger, Venkataramanan, (2005).
16. US2007010979, WO2006138530, "Apparatus, method and system for improved reservoir simulation using an algebraic cascading class linear solver" Schlumberger, Wallis, (2005).
17. U.S. Pat. No. 7,369,979, "Method for characterizing and forecasting performance of wells in multilayer reservoirs having commingled production" John P. Spivey (2005).
18. WO2007061618, "Simulation System and Method" ExxonMobile Upstream Res., Diyankov, (2005).
19. US2007203681, WO2007100827, "Monte carlo simulation of well logging data" Saudi Arabian Oil Co., Eyvazzadeh, (2006).
20. US2007265815, WO2008091353, "Method for optimal gridding in reservoir simulation" Schlumberger, Couet, (2006).
21. US2007288214, "Method for improving prediction of the viability of potential petroleum reservoirs" BHP Billiton, DeMartini, (2006).

22. US2008208539, "Method, Apparatus and System for Reservoir Simulation Using a Multi-Scale Finite Volume Method Including Black Oil Modeling" Chevron, Lee, (2006).
23. WO2008006851, "Method for Describing Relations in Systems on the Basis of an Algebraic Model" Shell, Lee, (2006).
24. WO2008008121, "Upscaling of Reservoir Models by Reusing Flow Solutions from Geologic Models" Exxonmobil Upstream Res Co, Wu, (2006).
25. US2008059140, "Method of Quantifying Hydrocarbon Formation and Retention in a Mother Rock" Inst Francais Du Petrole, Salmon, (2006).
26. US2008262809, "Method and System for Modelling Petroleum Migration" Permedia Res. Group, Carruthers, (2007).
27. Chow, "An Aggregation Multilevel Method Using Smooth Error Vectors," SIAM J. Sci. Comput., 27 (2006), pp. 1727-1741. UCRL-JRNL-204139
28. Efremov, et al. "Multilevel modeling of the influence of surface transport peculiarities on growth, shaping, and doping of Si nanowires," Physica E: Low-dimensional Systems and Nanostructures, 40:2446-53 (2008).
29. Naguib, et al. "Optimizing Field Performance Using Reservoir Modeling and Simulation" SPE 70037-MS, SPE Permian Basin Oil and Gas Recovery Conference, May 15-17, 2001, Midland, Tex.
30. Zhao, "Thesis: Mass Transfer to/from Distributed Sinks/Sources in Porous Media," Univ. Waterloo, Waterloo, Ontario, Canada, 2006 pp. 192

The invention claimed is:

1. A reservoir simulation solver method comprising:
 a) mapping a linear system matrix into a connectivity graph;
 b) determining one or more aggregates as a nested sequence of percolation clusters wherein the aggregates are grouped based on a physical characteristic of the reservoir;
 c) determining coarsening operator associated with a reduction of the aggregates at each level;
 d) using an initial value, smoothing corresponding residuals and reducing at least one aggregate to a coarser level;
 e) evaluating the reducing in step d) as sufficiently coarse to solve exactly or insufficiently coarse;
 f) smoothing new residuals if the reducing in step d) is insufficiently coarse and going to step d);
 g) solving the linear system matrix exactly to generate a solution if the reducing in step d) is sufficiently coarse;
 h) prolongating the solution and correcting the solution at a finer level, and
 i) generating a subterranean formation model including transformed connectivity, percolation and flow information.

2. The method of claim 1, wherein said aggregates are nested by recursively applying Hoshen-Kopelman algorithm on a predefined list of threshold values.

3. The method of claim 1, further comprising: prior to step i) repeating step g).

4. The method of claim 1, wherein the physical characteristic of the reservoir is selected from the group consisting of: permeability, porosity, transmissibility, mobility, and any combination thereof.

5. A non-transitory computer-readable storage medium having instructions stored therein, the instructions being executable by a processor to cause the processor to perform operations, the operations comprising:
 a) mapping a linear system matrix into a connectivity graph;
 b) determining one or more aggregates as a nested sequence of percolation clusters wherein the aggregates are grouped based on a physical characteristic of the reservoir;
 c) determining coarsening operator associated with a reduction of the aggregates at each level;
 d) using an initial value, smoothing corresponding residuals and reducing at least one aggregate to a coarser level;
 e) evaluating the reducing in step d) as sufficiently coarse or insufficiently coarse;
 f) smoothing new residuals if the reducing in step d) is insufficiently coarse and going to step d);
 g) solving the linear system matrix exactly to generate a solution if the reducing in step d) is sufficiently coarse;
 h) prolongating the solution and correcting the solution at a finer level; and
 i) generating a subterranean formation model including transformed connectivity, percolation and flow information.

6. The non-transitory computer-readable storage medium of claim 5, wherein said aggregates are nested by recursively applying Hoshen-Kopelman algorithm on a predefined list of threshold values.

7. The non-transitory computer-readable storage medium of claim 5, further comprising: prior to step i) repeating step g).

8. The method of claim 5, wherein the physical characteristic of the reservoir is selected from the group consisting of: permeability, porosity, transmissibility, mobility, and any combination thereof.

* * * * *